(12) United States Patent
Johansson et al.

(10) Patent No.: US 8,261,811 B2
(45) Date of Patent: Sep. 11, 2012

(54) ROLL LINE IN A CONTINUOUS CASTER

(75) Inventors: Mats Johansson, Västra Frölunda (SE); Daniel Johansson, Jönköping (SE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 13/003,523

(22) PCT Filed: May 14, 2009

(86) PCT No.: PCT/SE2009/000245
§ 371 (c)(1),
(2), (4) Date: Mar. 15, 2011

(87) PCT Pub. No.: WO2010/005354
PCT Pub. Date: Jan. 14, 2010

(65) Prior Publication Data
US 2012/0097358 A1    Apr. 26, 2012

(30) Foreign Application Priority Data
Jul. 8, 2008    (SE) ...................... 0801632

(51) Int. Cl.
*B22D 11/128* (2006.01)
(52) U.S. Cl. ...................... 164/448; 164/442
(58) Field of Classification Search .................. 164/269, 164/441, 442, 447, 448
See application file for complete search history.

(56) References Cited

U.S. PATENT DOCUMENTS

| 4,039,229 A | | 8/1977 | Ohlberg | |
|---|---|---|---|---|
| 4,164,252 A | * | 8/1979 | Scheurecker | ................. 164/448 |
| 4,187,698 A | | 2/1980 | Ohlson | |
| 4,351,383 A | * | 9/1982 | Gladwin | ....................... 164/448 |
| 4,485,836 A | * | 12/1984 | Streubel et al. | ............... 164/442 |
| 4,733,977 A | | 3/1988 | Eisenmann et al. | |

FOREIGN PATENT DOCUMENTS

| EP | 1537927 A1 | 6/2005 |
|---|---|---|
| EP | 1632686 A2 | 3/2006 |
| JP | 59189053 A | 10/1984 |
| JP | 2007177860 A | 7/2007 |
| JP | 2007185695 A | 7/2007 |

* cited by examiner

*Primary Examiner* — Kevin P Kerns
(74) *Attorney, Agent, or Firm* — Mark A. Ussai; Bryan Peckjian

(57) ABSTRACT

A roll line in a continuous caster is disclosed. It comprises at least two segment roll lines (1, 2) for transporting steel. Each segment roll line (1, 2) comprises a roll body (3, 4), bearings (5) for supporting the roll body (3, 4), bearing housings (6). The roll body (3, 4) has two shaft ends (7, 8, 9, 10), and a ring (11). Adjacent shaft ends (8, 9) of segment roll lines (1, 2) are at least partly inside the through-hole of the ring (11) and the adjacent shafts ends (8, 9) are connected via torque transferring element (t1). There is a closed compartment (12) for receiving lubricant for lubricating the torque transferring element (T1). The closed compartment (12) is in the through-hole and is sealed off by sealing elements (s1, s2) located between the ring (11) and circumferential surfaces of the first and second adjacent shaft ends (8, 9).

13 Claims, 2 Drawing Sheets

ROLL LINE IN A CONTINUOUS CASTER

TECHNICAL FIELD OF THE INVENTION

The invention concerns continuous casting of steel. More specifically, the invention concerns a roll line in a continuous casting machine.

BACKGROUND OF THE INVENTION

Continuous casting of steel is a demanding process, characterized by high temperatures and large temperature variations. Furthermore, water cooling of the steel strand and steam results in a very corrosive environment. For driven roll lines, where roll lines are divided into segments, there is a need to connect the segments by mechanical couplings. These mechanical couplings are lubricated, most often by grease. The couplings are continuously lubricated in order to secure and maintain the performance of the coupling.

In the art it is well known to make use of lubricating systems to accommodate a suitable lubrication. A lubricating system comprises pipes for inlet and outlet of the lubricant, lubricant pumps etc. A limitation with lubricating systems is that there is a risk that the lubricating system is damaged, such as breakage of the pipes and/or the pumps. If this happens, the coupling may be un-lubricated, resulting in a lower performance of the coupling, or even a breakdown of the coupling. Furthermore, lubricating systems take up unnecessary space in the continuous casting machine. Also, lubrication systems may, in case of e.g. break down, have a negative environmental effect. Also, a lubrication system consumes a considerable amount of lubricant.

Thus, it would be advantageous to have a solution in which there is no lubricating system, for reasons of 1) operational reliability, 2) environment, 3) saving space in the roll line/the continuous caster, and 4) being more efficient in the usage of lubricant.

SUMMARY OF THE INVENTION

According to the present invention a roll line for a continuous casting machine is provided. The present invention solves the problems of having a roll line without a lubrication system, i.e. a re-lubrication free solution. Thus there is need to provide the roll line with a lubricant only once. Effects of the present invention include 1) increased operational reliability since there is no need for a lubrication system, 2) a positive impact on the environment, 3) saving space in the continuous caster leading to an ability to increase e.g. load or level of compactness, and 4) improved usage of lubricant. This is accomplished by the present invention.

The roll line comprises at least two segment roll lines for transporting steel and being arranged along one axial line. Each segment roll line comprises a roll body to be in supportive contact with the steel, bearings for supporting the roll body, bearing housings for housing the bearings, wherein the roll body has two shaft ends. Furthermore, the roll line comprises a ring presenting a through-hole, wherein a first and a second adjacent shaft ends of the at least two segment roll lines are at least partly inside the through-hole of the ring, the first and second adjacent shafts ends being connected via at least one torque transferring element.

In an embodiment, the ring is preferably made in one piece. If the ring is made in for instance two pieces, it may lead to a more space consuming solution. Furthermore, the roll line comprises a closed compartment for receiving lubricant for lubricating the at least one torque transferring element, the closed compartment being in the through-hole and is sealed off by sealing elements located between the ring and circumferential surfaces of the first and second adjacent shaft ends, and wherein a relative axial movement is allowed between at least one of the sealing elements and one of the surfaces in which the at least one sealing element is sealing against. The present invention leads to that there is no need to re-lubricate the at least one torque transferring element. The closed compartment keeps the lubricant in connection with the at least one torque transferring element during the life time of the roll line. Due to this, there is no need of a re-lubricating system. Furthermore, the roll line is more compact than known roll lines, since there are no pipes and pumps for transporting lubricant.

In an embodiment, the roll line further comprises a first intermediate ring between the circumferential surface of the first adjacent shaft end and the ring. At least three torque transferring elements for transferring torque is between the first and second adjacent shaft ends. The first torque transferring element is transferring torque between the circumferential surface of the second adjacent shaft end and the ring. The second torque transferring element is transferring torque between the first intermediate ring and the ring. The third torque transferring element is transferring torque between the first intermediate ring and the circumferential surface of the first adjacent shaft end. An intermediate ring may lead to several advantages. For instance, when there are high torques that are transferred, as it may be in a roll line, it may be good to have a larger leverage, which reduces the forces on the torque transferring elements.

In an embodiment, when the roll line comprises the first intermediate ring, the closed compartment is sealed off by
a) a first sealing element located between the circumferential surface of the second adjacent shaft end and the ring, and
b) a second sealing element located between the first intermediate ring and the ring, and
c1) a third sealing element located between the intermediate ring and one of the circumferential surface of the first adjacent shaft end, or
c2) an axial side face of the second adjacent shaft end.

In an embodiment, when the roll line comprises the first intermediate ring, it further comprises,
a second intermediate ring between the circumferential surface of the second adjacent shaft end and the ring,
a fourth torque transferring element for transferring torque between the first and second adjacent shaft ends, wherein the fourth torque transferring element is transferring torque between the second intermediate ring and the circumferential surface of the second adjacent shaft end, and
wherein the first torque transferring element is transferring torque between the second intermediate ring and the ring. A second intermediate ring may further improve the connection between the at least two segment roll lines. As mentioned before, an intermediate ring is for instance advantageous to achieve a larger leverage, but it may be good for other reasons as well, which will be further described below.

In an embodiment, when the roll line comprises the first and the second intermediate ring, the closed compartment is sealed off by:
a) a first sealing element located between the second intermediate ring and the ring, b) a second sealing element located between the first intermediate ring and the ring, and one of:
   c1) a third sealing element located between the first and second intermediate ring, or
   c2) a third sealing element located between the first intermediate ring and the circumferential surface of the first adjacent shaft end and a fourth sealing element located between the second intermediate ring and the circumferential surface of the second adjacent shaft end.

In an embodiment, the at least one torque transferring element is arranged for allowing the first or the second adjacent shaft end to be angularly misaligned. For instance, when the there are intermediate rings between the ring and the adjacent shaft ends, any or both the torque transferring elements between the intermediate rings and the ring may be designed to allow a misalignment between the two adjacent shaft ends. For instance, the torque transferring elements may be curved toothings/splines, but there are also other possible designs of the torque transferring elements to allow misalignments.

In an embodiment, the roll line further comprises a pressure compensating means comprising a movable part in connection to the closed compartment. A pressure change in the closed compartment leads to a movement of the movable part. Due to the harsh environment, including high temperature variations, the volume of the grease may vary. Therefore, there may be a need to vary the volume in the closed compartment so that the pressure does not increase too much. If the pressure increases too much, grease may leak out from the closed compartment at the sealing element positions. The pressure compensating means ascertains that there is no grease leakage out from the closed compartment. Thus, a pressure change in the closed compartment leads to a volume change in the closed compartment.

In an embodiment, the movable part of the pressure compensating means is constituted by at least one of an elastic membrane, or a piston able of moving back and forth. An alternative is a dampering means e.g. including a piston able to move back and forth. In an embodiment, the movable part is on a sealing. The term movable part means that there is at least one part that is movable, e.g. as described above, there may be a membrane wherein the movable part is the part that bulges in or out as the pressure increases or decreases.

In an embodiment, the pressure compensating means comprises an energy absorbing/releasing means capable of absorbing/releasing energy during a movement of the movable part. Thus in this embodiment, the movable part is able to store energy. In a further embodiment, when the energy absorbing/releasing means is releasing energy, lubricant is pushed to the at least one torque transferring element. Thus, when the movable part of the pressure compensating means has moved so that the volume of the closed compartment has increased, the pressure compensating means has absorbed energy. This energy is used to push lubricant back when the pressure decreases, i.e. when the volume of the lubricant decreases. Due to this, it is ascertained that the at least one torque transferring element is lubricated also after a volume decrease of the lubricant.

In an embodiment, the movable part of the pressure compensating means is constituted by at least one of an elastic membrane, or a piston connected to a spring. In order to ascertain that no grease will leak out, the pressure on the closed compartment, which results from the energy absorbed in the membrane or in the spring, needs to be equal or lower than the pressure needed to open the sealing elements.

In an embodiment, the movable part of the pressure compensating means is placed in a position:
   outside the outer surface of ring, or in the through-hole of the ring.

In an embodiment, the at least one torque transferring element is any of:
   splines, a non-circular connection, side face splines, or a male/female connection.

DETAILED DESCRIPTION OF PREFERRED EMBODIMENTS

Figure 1:
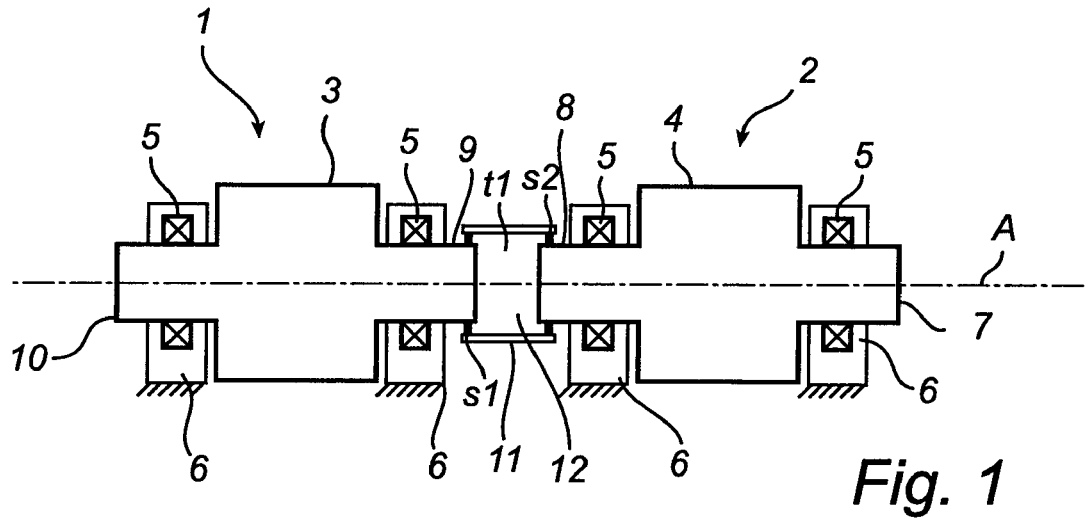
FIG. 1. A cross section of a roll line showing two segment roll lines.

FIG. 1 shows a cross section of a roll line according to the present invention. The roll line comprises at least two segment roll lines 1, 2 for transporting steel and arranged along one axial line A. Each segment roll line comprising a roll body 3, 4 to be in supportive contact with the steel, bearings 5 for supporting the roll body 3, 4, bearing housings 6 for housing the bearings 5, the roll body 3, 4 having two shaft ends 7, 8, 9, 10. The roll line further comprises a ring 11 presenting a through-hole. A first and a second adjacent shaft ends 8, 9 of the at least two segment roll lines 1, 2 are at least partly inside the through-hole of the ring 11. The first and second adjacent shafts ends 8, 9 are connected to at least one torque transferring element t1. The at least one torque transferring element t1 may be designed in different ways. For instance, it may be splines/toothings, side face splines or a male/female coupling. Side face splines means that the splines connection is placed on end faces of the two adjacent shaft ends 8, 9. Furthermore, the roll line comprises a closed compartment 12 for receiving lubricant for lubricating the at least one torque transferring element t1. The closed compartment 12 is in the through-hole and is sealed off by sealing elements s1, s2 located between the ring and circumferential surfaces of the first and second adjacent shaft ends. A relative axial movement is allowed between at least one of the sealing elements s1 and s2 and one of the surfaces in which the at least one sealing element s1, s2 is sealing against.

Figure 2:
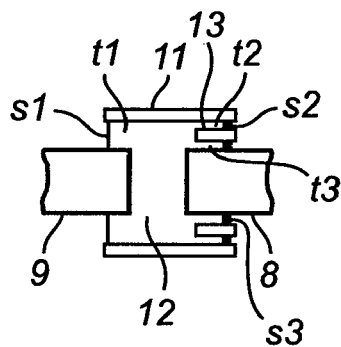
FIG. 2. A cross section of an embodiment of a roll line according to the present invention.

FIG. 2 is an enlarged view of a cross section of an embodiment of the connection between the two adjacent shaft ends 8, 9. In this embodiment, a first intermediate ring 13 is between the ring 11 and the first adjacent shaft end 8. A first torque transferring element t1 is between the ring and the second adjacent shaft end 9, a second torque transferring element t2 is between the ring 11 and the first intermediate ring 13, a third torque transferring element t3 is between the first intermediate ring 13 and the first adjacent shaft end 8. The torque transferring elements may for instance be splines. Also, the torque transferring elements may allow misalignments. For instance, torque transferring element t2 may be a curved tooth connection allowing misalignments. Furthermore, sealing elements s1, s2 and s3 creates a closed compartment 12. The seal s1 is sealing between the ring 11 and the second adjacent shaft end 9, the seal s2 is sealing between the ring 11 and the first intermediate ring 13, the seal s3 is sealing between the intermediate ring 13 and the first adjacent shaft end 8. In an embodiment, the seal s3 is sealing between the intermediate ring 13 and the side face of the second adjacent shaft end 9, not shown in the figure.

Figure 3:
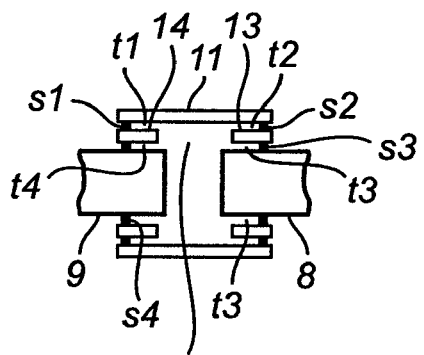
FIG. 3. A cross section of another embodiment of a roll line according to the present invention.

FIG. 3 is an enlarged view of a cross section of another embodiment of the connection between the two adjacent shaft ends 8, 9. In this embodiment, a first and a second intermediate ring 13, 14 are between the ring and the two adjacent shaft ends 8 and 9. A first torque transferring element t1 is between the ring and the second intermediate ring 14, a second torque transferring element t2 is between the ring 11 and the first intermediate ring 13, a third torque transferring element t3 is between the first intermediate ring 13 and the first adjacent shaft end 8 and a fourth torque transferring element t4 is between the second intermediate ring 14 and the second adjacent shaft end 9. Furthermore, sealing elements s1, s2, s3 and s4 creates a closed compartment 12. The seal s1 is sealing between the ring 11 and the second intermediate ring 14, the seal s2 is sealing between the ring 11 and the first intermediate ring 13, the seal s3 is sealing between the intermediate ring 13 and the first adjacent shaft end 8 and the seal s4 is sealing between the second intermediate ring 14 and the second adjacent shaft end 9. In an embodiment, there are only three seals. In that embodiment, the seal s1 and s2 seals as in FIG. 3, but instead of s3 and s4, there is a third seal that seals between the first and the second intermediate rings 13 and 14, creating a closed compartment 12 for the first and the second torque transferring elements t1 and t2. In some situations, it is only necessary to lubricate some of the torque transferring elements. For instance, if the first and the second torque transferring element t1 and t2 allow misalignments of the two adjacent shaft ends 8 and 9, and torque transferring elements t3, t4 do not allow misalignments, it may only be necessary to lubricate t1 and t4.

Figure 4:
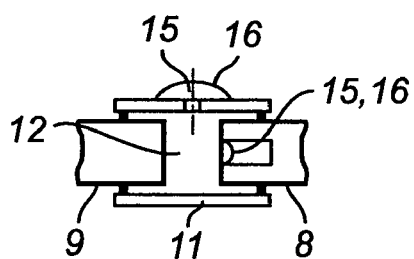
FIG. 4. A cross section of another embodiment of a roll line, including examples of pressure compensating means according to the present invention.

FIG. 4 is an enlarged view of a cross section of two embodiments of the connection between the two adjacent shaft ends 8 and 9. In these embodiments, a pressure compensating means 15 is on the ring 11 or on the adjacent shaft end 8. The pressure compensating means 15 is in these embodiments a membrane. The pressure compensating means comprises a movable part 16, which in these embodiments is the same as the pressure compensating means 15. In the case when the pressure compensating means is on the ring 11, a connection, a bore, is between the pressure compensating means and the closed compartment 12. The pressure compensating means 15 may also be on the adjacent shaft end 9. The pressure compensating means 15 may have an energy absorbing/releasing means. If the membrane 15 is elastic, the membrane 15 may absorb energy to then use that energy to push lubricant back when the volume of the lubricant decreases. Alternatively, the energy absorbing/releasing means is accomplished by a piston supported by a spring.

Figure 5:
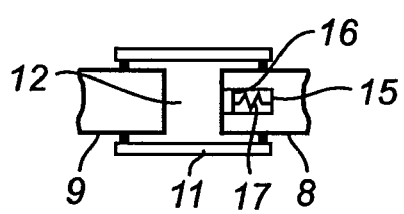
FIG. 5. A cross section of another embodiment of a roll line, including examples of pressure compensating means according to the present invention.

FIG. 5 is an enlarged view of a cross section of another embodiment of the connection between the two adjacent shaft ends 8, 9. A pressure compensating means 15 is on the adjacent shaft end 8. In this embodiment, the movable part 16 is a piston that is able to move in relation to a pressure change, leading to a volume change of the closed compartment 12. Furthermore, in this embodiment, a spring 17 is connected to the movable part 16 in order to absorb/release energy during movement of the movable part 16. In another embodiment, the pressure compensating means 15 may be a damper, without the ability to absorb/release energy. In another embodiment, the pressure compensating means 15 may be included into at least one of the sealing elements, with or without the ability to absorb/release energy.

Figure 6:
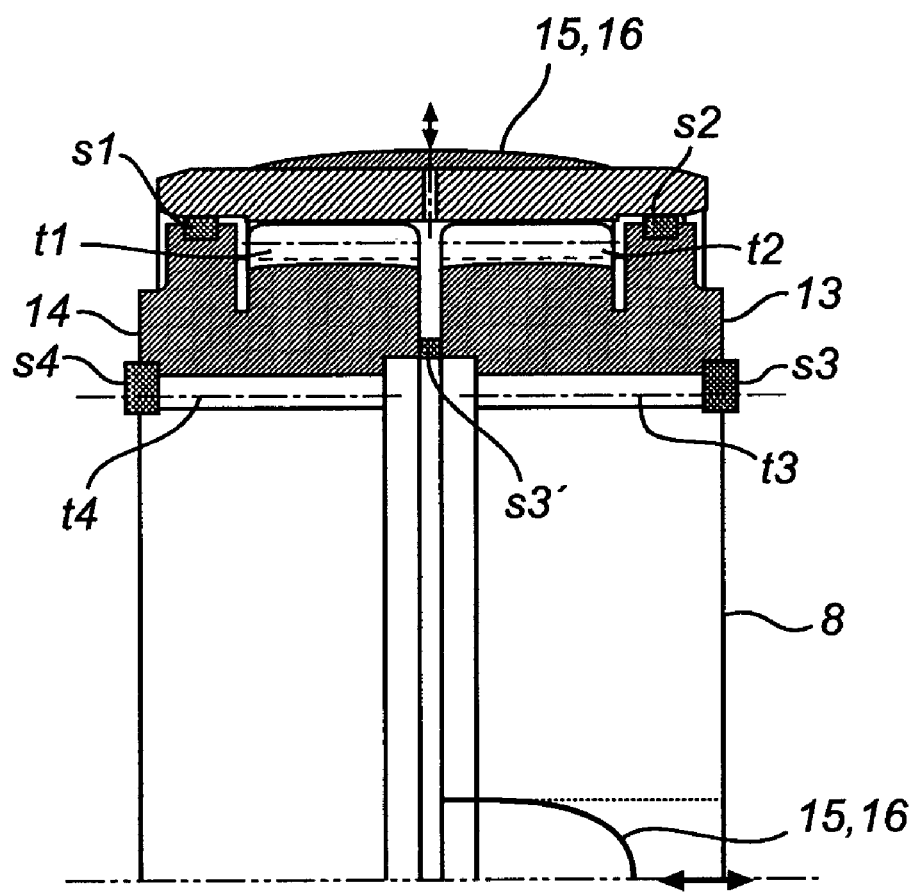
FIG. 6. A cross section of another embodiment of the present invention, including two intermediate rings with splines as torque transferring elements.

FIG. 6 is an enlarged view of a cross section of embodiments of the present invention. It comprises two adjacent shaft ends 8 and 9, a ring 11, two intermediate rings 13 and 14, torque transferring elements t1, t2, t3 and t4. Furthermore, sealing elements s1, s2, s3, s3' and s4 is shown. In one embodiment, there are three sealing elements (s1, s2 and s3'). Sealing element s3 and s4, shown in the FIG. 6, are not present in that embodiment. Furthermore, torque transferring element t1 and t2 are in the closed compartment for receiving lubricant, and torque transferring element t3 and t4 are outside the closed compartment. In some cases, it may only be needed to lubricate t1 and t2, especially when it only is t1 and t2 that allow misalignment, which they do in this embodiment (t1 and t2 comprise splines with a curved profile in order to allow misalignments of the adjacent shaft ends 8 and 9). It may be important for sealing element s3' to allow large axial displacements without the sealing effect being affected. For instance, s3' may be a seal with a V-shape that can flex axially to allow axial displacements. In another embodiment, sealing elements s1, s2, s3 and s4 are present, and not s3'. In this case, all torque transferring elements are in the closed compartment for receiving lubricant. Furthermore, t3 and t4 is in this figure splines without a curved profile, but they may also be splines with a curved profile. In addition, pressure compensating means 15 are shown. In one embodiment, the pressure compensating means 15 is on the ring 11. In another embodiment, the pressure compensating means 15 is integrated in one of the adjacent shaft ends, in this case shaft end 8. In another embodiment, there are two pressure compensating means 15 as shown in the figure. In all embodiments in this figure, the pressure compensating means is a membrane, wherein the movable part 16 is the membrane. The membrane is elastic, so that energy can be absorbed/released in order to push lubricant back when the volume of the grease in the closed compartment decreases. In the embodiment, when the pressure compensating means 15 is integrated into one of the adjacent shaft ends 8 or 9, the pressure compensating means 15 may be in a bore of the shaft 8 or 9. In the embodiment when the pressure compensating means 15 is a membrane and is on the ring 11, the membrane may be extending all around the ring, or only for a part of the ring. The membrane may also be a plunger.

The invention claimed is:

1. A roller line for transporting steel in a continuous caster, the roller line comprising:
    at least two roller line segments arranged along an axial line each roller line segment including a roller body configured to be in supportive contact with the steel and having two shaft ends, at least two bearings each configured to support a separate shaft end of the roller body, and two bearing housings each configured to house a separate one of the bearings
    a ring having a through-hole, each roller body of the two roller line segments having one shaft end at least partly disposed inside the through-hole of the ring, the two shaft ends disposed within the ring being at least generally adjacent,
    at least one torque transferring element configured to connect the two adjacent shaft ends,
    wherein the ring further has a closed compartment configured to receive lubricant for lubricating the at least one torque transferring element, the closed compartment being defined in the through-hole and sealed off by sealing elements located between the ring and circumferential surfaces of the first and second adjacent shaft ends, and wherein a relative axial movement is allowed between at least one of the sealing elements and one of the surfaces in which the at least one sealing element is sealing against.

2. The roller line according to claim 1, further comprising a first intermediate ring disposed between the circumferential surface of one of the adjacent shaft ends and the ring, wherein the at least one torque transferring element includes:
- a first torque transferring element configured to transfer torque between the circumferential surface of the other one of the adjacent shaft ends and the ring,
- a second torque transferring element configured to transfer torque between the first intermediate ring and the ring, and
- a third torque transferring element configured to transfer torque between the first intermediate ring and the circumferential surface of the one adjacent shaft end.

3. The roller line according to claim 2, wherein the sealing elements include:
- a first sealing element located between the circumferential surface of the other one of the adjacent shaft ends and the ring,
- a second sealing element located between the first intermediate ring and the ring, and
- a third sealing element located between the intermediate ring and one of the circumferential surface of the one adjacent shaft end and an axial side face of the other one of the adjacent shaft ends.

4. The roller line according to claim 2, further comprising a second intermediate ring disposed between the circumferential surface of the other one of the adjacent shaft ends and the ring, wherein the at least one torque transferring element further includes a fourth torque transferring element configured to transfer torque between the second intermediate ring and the circumferential surface of the other one of the adjacent shaft ends, wherein the first torque transferring element is configured to transfer torque between the second intermediate ring and the ring.

5. The roller line according to claim 4, wherein the the sealing elements include:
- a first sealing element located between the second intermediate ring and the ring,
- a second sealing element located between the first intermediate ring and the ring, and one of:
- a third sealing element located between the first and second intermediate rings
- a third sealing element located between the first intermediate ring and the circumferential surface of the one adjacent shaft end and a fourth sealing element located between the second intermediate ring and the circumferential surface of the other one of the adjacent shaft ends.

6. The roller line according to claim 1, wherein the at least one torque transferring element is configured to allow at least one of the two adjacent shaft ends to be angularly misaligned.

7. The roller line according to claim 1, further comprising a pressure compensating means including a movable part coupled with the ring such that a pressure change in the closed compartment moves the movable part.

8. The roller line according to claim 7, wherein the pressure compensating means includes an energy absorbing/releasing means configured to at least one of absorb energy and release energy during a movement of the movable part.

9. The roller line according to claim 8, wherein when the energy absorbing/releasing means releases energy, lubricant is pushed to the at least one torque transferring element.

10. The roller line according to claim 7, wherein the movable part includes at least one of an elastic membrane and a piston.

11. The roller line according to claim 8, wherein the movable part includes at least one of an elastic membrane and a piston connected to a spring.

12. The roller line according to claim 7, wherein the movable part is disposed one of outside the outer surface of ring and in the through-hole of the ring.

13. The roller line according to claim 1, wherein the at least one torque transferring element includes at least one of splines, non-circular connectors, and male/female connectors.

* * * * *